(12) United States Patent
Kondo et al.

(10) Patent No.: US 11,554,807 B2
(45) Date of Patent: Jan. 17, 2023

(54) TURNING DEVICE

(71) Applicant: JTEKT CORPORATION, Osaka (JP)

(72) Inventors: Yoshio Kondo, Kazaki (JP); Fumio Kishida, Toyota (JP); Toshiaki Ogata, Okazaki (JP); Keishi Nakamura, Okazaki (JP); Hirohide Suzuki, Nisshin (JP)

(73) Assignee: JTEKT CORPORATION, Kariya (JP)

( * ) Notice: Subject to any disclaimer, the term of this patent is extended or adjusted under 35 U.S.C. 154(b) by 386 days.

(21) Appl. No.: 16/787,257

(22) Filed: Feb. 11, 2020

(65) Prior Publication Data
US 2020/0262470 A1 Aug. 20, 2020

(30) Foreign Application Priority Data

Feb. 19, 2019 (JP) .............................. JP2019-027146
Apr. 5, 2019 (JP) .............................. JP2019-072373
May 10, 2019 (JP) .............................. JP2019-089443

(51) Int. Cl.
| | |
|---|---|
| B62D 5/04 | (2006.01) |
| B62D 3/08 | (2006.01) |
| B62D 3/12 | (2006.01) |
| F16H 19/04 | (2006.01) |

(Continued)

(52) U.S. Cl.
CPC ............ B62D 5/0448 (2013.01); B62D 3/08 (2013.01); B62D 3/12 (2013.01); B62D 5/0418 (2013.01); B62D 5/0454 (2013.01); F16H 19/04 (2013.01); F16H 25/2204 (2013.01); F16H 2025/2075 (2013.01); F16H 2025/2081 (2013.01)

(58) Field of Classification Search
CPC .......... B62D 5/0448; B62D 3/08; B62D 3/06; B62D 5/0418; B62D 5/0445
See application file for complete search history.

(56) References Cited

U.S. PATENT DOCUMENTS 9,771,969 B2 * 9/2017 Tokioka .................. B62D 1/20
2019/0329816 A1 * 10/2019 Ko ....................... B62D 5/0424

FOREIGN PATENT DOCUMENTS

| EP | 3581465 A2 | 12/2019 |
|---|---|---|
| JP | 2010-214978 A | 9/2010 |

(Continued)

OTHER PUBLICATIONS

Jul. 2, 2020 Extended Search Report issued in European Patent Application No. 20156657.7.

*Primary Examiner* — Randell J Krug
(74) *Attorney, Agent, or Firm* — Oliff PLC

(57) ABSTRACT

A turning device includes a turning shaft having a first ball screw groove as one of a left screw and a right screw and a second ball screw groove as the other of the left screw and the right screw and turning wheels to be turned by moving in an axial direction, a first electric motor generating a first driving force, a second electric motor operating independently of the first electric motor and generating a second driving force, a first ball screw nut transmitting the first driving force generated by the first electric motor to the first ball screw groove, a second ball screw nut transmitting the second driving force generated by the second electric motor to the second ball screw groove, and a rotation regulating part regulating relative rotation of the turning shaft around an axis with respect to a housing.

9 Claims, 10 Drawing Sheets

(51) Int. Cl.
*F16H 25/22* (2006.01)
*F16H 25/20* (2006.01)

(56) References Cited

FOREIGN PATENT DOCUMENTS

| | | | |
|---|---|---|---|
| JP | 2012-045978 | A | 3/2012 |
| KR | 20060004279 | A | 1/2006 |

* cited by examiner

TURNING DEVICE

CROSS REFERENCE TO RELATED APPLICATIONS

This application claims priority based on Japanese Patent Application No. 2019-027146 filed on Feb. 19, 2019, Japanese Patent Application No. 2019-072373 filed on Apr. 5, 2019, and Japanese Patent Application No. 2019-089443 filed on May 10, 2019, the entire contents of which are incorporated by reference herein.

TECHNICAL FIELD

The present invention relates to a turning device.

BACKGROUND ART

In the related art, for example, JP2010-214978A discloses a turning device. The turning device in the related art includes divided turning shafts in which a turning shaft connected to wheels to be turned and for turning the wheels to be turned is divided into two, which is applied to a steer-by-wire steering device in which mechanical connection with respect to a steering wheel operated by a driver is released. The related-art turning device includes a sliding screw mechanism formed by screw shaft portions having a relation of left and right screws with respect to respective divided turning shafts and a sliding screw nut. The sliding screw mechanism is provided with motors transmitting driving forces to respective turning shafts through output transmission mechanisms. The related-art turning device provided with such sliding screw mechanism is capable of turning wheels even when a failure occurs in any one of motors.

SUMMARY OF INVENTION

Technical Problem

Incidentally, the turning shafts (divided turning shafts) are connected to the wheels to be turned through ball joints in the turning device for allowing the wheels to be turned supported by a suspension to move in a vertical direction in general. In this case, when the motors move the divided turning shafts in an axial direction through the sliding screw mechanism in the related-art turning device, there is a possibility that the sliding screw mechanism and the divided turning shafts rotate together around an axis by the driving force in a case where the driving force (torque) added from the sliding screw nut to the divided turning shafts exceeds a frictional force of the ball joints. As a result, there is a danger that the divided turning shafts do not move in the axial direction and the wheels to be turned are not turned even when the sliding screw nut is rotated.

Accordingly, a rotation stopping mechanism such as a rack and pinion is necessary for respective divided turning shafts for preventing rotation of the divided turning shafts. In this case, a large load is applied to the rotation stopping mechanisms when the outputs of the motors are increased so that the wheels to be turned are turned to the maximum. Therefore, it is necessary to increase the size of the rotation stopping mechanism or to change a material for the rotation stopping mechanism for securing strength, as a result, the steer-by-wire steering device may be increased in size and may be increased in cost.

The present invention has been made for solving the above problems, and an object thereof is to provide an inexpensive turning device capable of reducing the size.

Solution to Problem

A turning device according to the present invention includes a hollow housing, a turning shaft housed inside the housing, having a first male groove formed by one threading manner of a left screw and a right screw and a second male screw groove formed by the other threading manner of the left screw and the right screw, and turning left and right wheels to be turned by moving in an axial direction, a first nut screwed to the first male screw groove and rotatably supported inside the housing, a second nut screwed to the second male screw groove and rotatably supported inside the housing, a first driving source generating a first driving force, a second driving source operating independently of the first driving source and generating a second driving force, a first power transmission part transmitting the first driving force generated by the first driving source to the first nut and giving an axial force to the turning shaft by rotating the first nut and a second power transmission part transmitting the second driving force generated by the second driving source to the second nut and giving the axial force to the turning shaft by rotating the second nut.

According to the above, the first power transmission part is capable of transmitting the first driving force from the first driving source to the first male screw groove through the first nut, and the second power transmission part is capable of transmitting the second driving force from the second driving source to the second male screw groove through the second nut. The first male screw groove is one of the left screw and the right screw, and the second male screw groove is the other of the left screw and the right screw. Accordingly, at the time of moving the turning shaft in the axial direction, it is possible to generate torques acting in directions which cancel each other in the first male screw groove and the second male screw groove by the transmitted first driving force and the second driving force. Accordingly, the turning shaft can be moved in the axial direction, namely, the wheels to be turned can be turned while omitting a rotation stopping mechanism for preventing the turning shaft, the first nut and the second nut from rotating together around an axis. Therefore, the turning device can be inexpensive, and size reduction of the turning device can be realized.

DESCRIPTION OF EMBODIMENTS

1. Structure of Turning Device 10

Figure 1:
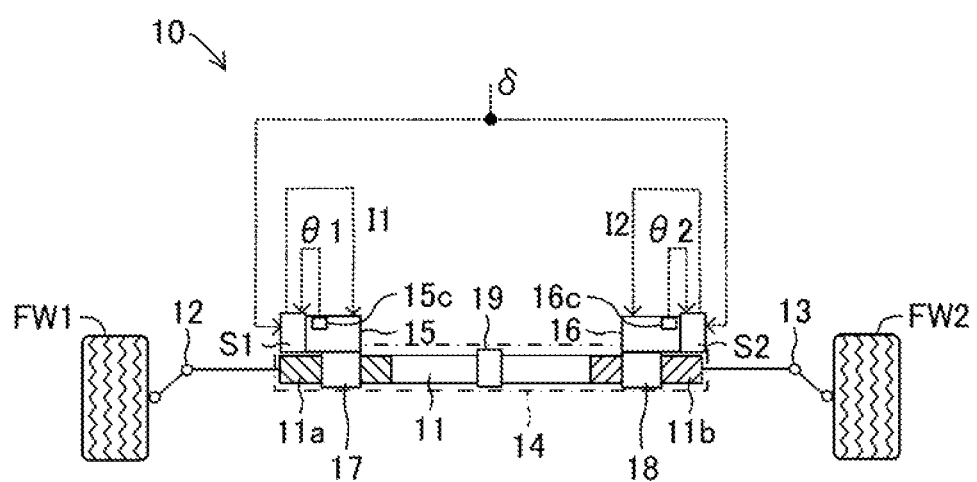
FIG. 1 is an entire view showing a structure of a turning device.
Figure 2:
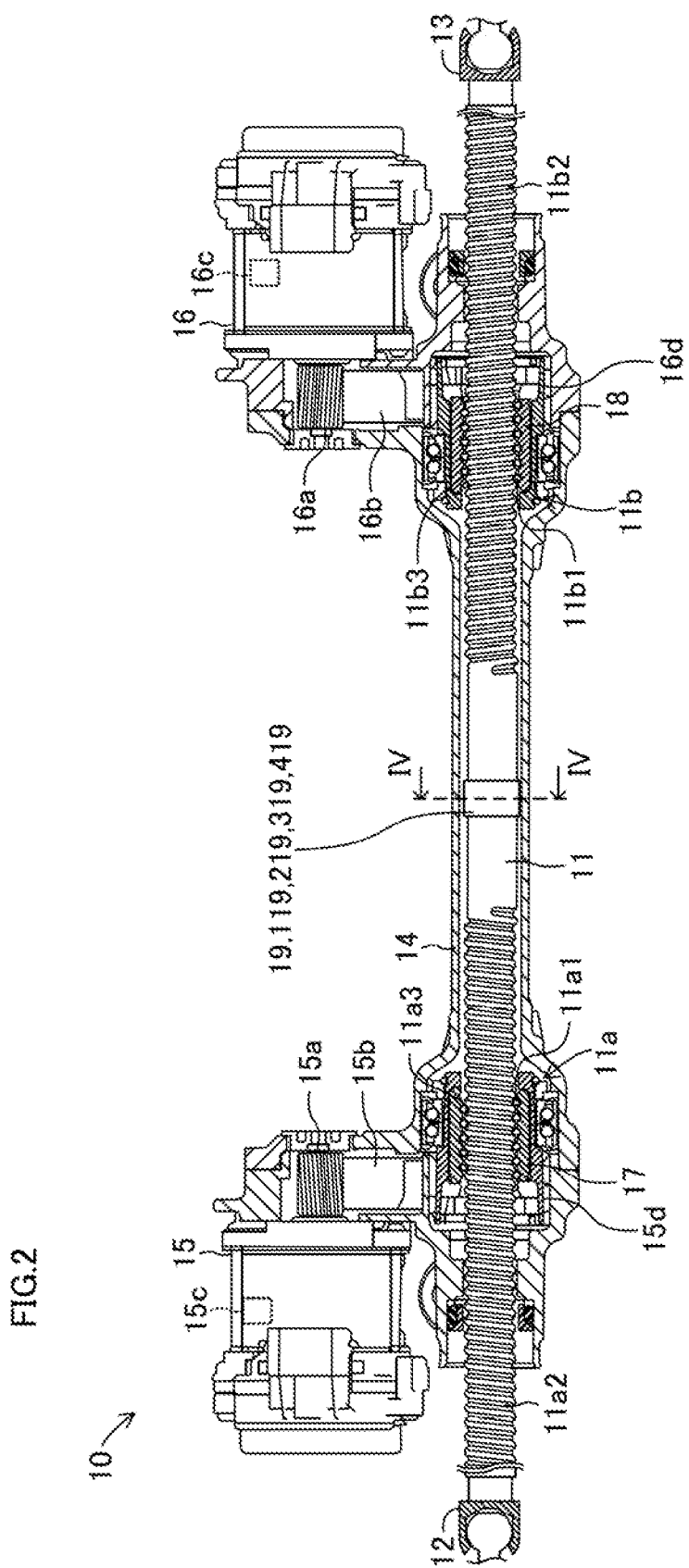
FIG. 2 is a cross-sectional view showing the structure of the turning device in detail.

A structure of a turning device 10 according to an embodiment of the present invention will be explained. The turning device 10 includes a turning shaft 11 connected to left and right front wheels FW1, FW2 as left and right wheels to be turned and for turning the left and right front wheels FW1, FW2 as shown in FIG. 1. Both ends of the turning shaft 11 are connected to ball joints 12, 13 as shown in FIG. 1 and FIG. 2. Then, the turning shaft 11 is connected to the left and right front wheels FW1, FW2 through a link mechanism (for example, a tie rod) connected to the ball joints 12, 13.

The turning shaft 11 is housed inside a hollow housing 14 so as to be displaced in an axial direction. The turning shaft 11 includes a first ball screw groove 11a2 as a first male screw groove formed by one threading manner of a left screw and a right screw in a first area in the axial direction. The turning shaft 11 also includes a second ball screw groove 11b2 as a second male screw groove formed by the other threading manner of the left screw and the right screw in a second area different from the first area. In the embodiment, the first area and the second area correspond to both ends of the turning shaft 11 in the axial direction. The turning shaft 11 turns the left and right front wheels FW1, FW2 (wheels to be turned) by relatively moving in the axial direction with respect to the housing 14.

Then, a first ball screw nut 17 as a first nut rotatably supported inside the housing 14 is screwed to the first ball screw groove 11a2. A second ball screw nut 18 as a second nut rotatably supported inside the housing 14 is screwed to the second ball screw groove 11b2. Accordingly, a first ball screw part 11a is formed by the first ball screw groove 11a2 and the first ball screw nut 17 in the first area one of both ends in the turning shaft 11. A second ball screw part 11b is also formed by the second ball screw groove 11b2 and the second ball screw nut 18 in the second area.

The first ball screw part 11a has a rolling passage 11a3 for rolling balls 11a1 as spherical rolling elements as shown in FIG. 2. The second ball screw part 11b has a rolling passage 11b3 for rolling balls 11b1 as spherical rolling elements. Then, the rolling passage 11a3 and the rolling passage 11b3 has a relation of left and right screws (opposite screws of each other). In the rolling passage 11a3 and the rolling passage 11b3, plural balls 11a1 and balls 11b1 respectively roll while circulating therein.

The turning device 10 also includes a first electric motor 15 as a first driving source and a second electric motor 16 as a second driving source as shown in FIG. 1 and FIG. 2. Respective operations of the first electric motor 15 and the second electric motor 16 are independently controlled by turning controllers S1, S2. Accordingly, the first electric motor 15 generate a first driving force and the second electric motor 16 generate a second driving force independently of the first electric motor 15. Here, the first electric motor 15 and the second electric motor 16 are fixed to the housing 14 so that output shafts (more specifically, later-described pulley 15a and pulley 16a) face each other as shown in FIG. 2.

The turning device 10 includes the first ball screw nut 17 as a first screwing member included in a first power transmission part and forming the first power transmission part and the second ball screw nut 18 included in a second power transmission part and forming the second power transmission part. The first ball screw nut 17 is arranged coaxially with the first ball screw groove 11a2 of the first ball screw part 11a provided in the turning shaft 11. The second ball screw nut 18 is arranged coaxially with the second ball screw groove 11b2 of the second ball screw part 11b provided in the turning shaft 11.

The first driving force is transmitted to the first ball screw nut 17 from the first electric motor 15 through the pulley 15a and a pulley 15d forming the first power transmission part and a belt 15b as an endless member forming the first power transmission part as shown in FIG. 2. The first ball screw nut 17 is housed and fixed inside the pulley 15d having a bottomed cylindrical shape. The first ball screw nut 17 rotates relatively with respect to the first ball screw groove 11a2 when the first driving force is transmitted from the first electric motor 15 through the pulley 15a, the belt 15b and the pulley 15d.

Accordingly, the balls 11a1 arranged between the first ball screw groove 11a2 of the first ball screw part 11a and the first ball screw nut 17 roll along the rolling passage 11a3, and the first driving force of the first electric motor 15 is converted into a force (axial force) that moves the turning shaft 11 in the axial direction, namely, a turning force for turning the left and right front wheels FW1, FW2. In this case, the first ball screw nut 17 transmits the first driving force transmitted from the first electric motor 15 to the first ball screw groove 11a2 of the first ball screw part 11a, namely, the turning shaft 11 while reducing a rotation speed, giving a first torque T1 to the turning shaft 11 in the first ball screw part 11a.

The second driving force is transmitted to the second ball screw nut 18 from the second electric motor 16 through the pulley 16a and a pulley 16d forming the second power transmission part and a belt 16b as an endless member forming the second power transmission part as shown in FIG. 2. The second ball screw nut 18 is housed and fixed inside the pulley 16d having a bottomed cylindrical shape. The second ball screw nut 18 rotates relatively with respect to the second ball screw groove 11b2 when the second driving force is transmitted from the second electric motor 16 through the pulley 16a, the belt 16b, and the pulley 16d.

Accordingly, the balls 11b1 arranged between the second ball screw groove 11b2 of the second ball screw part 11b and the second ball screw nut 18 roll along the rolling passage 11b3, and the second driving force of the second electric motor 16 is converted into a turning force that moves the turning shaft 11 in the axial direction. In this case, the second ball screw nut 18 transmits the second driving force transmitted from the second electric motor 16 to the second ball screw groove 11b2 of the second ball screw part 11b, namely, the turning shaft 11 while reducing a rotation speed, giving a second torque T2 to the turning shaft 11 in the second ball screw part 11b.

Here, the first ball screw groove 11a2 of the first ball screw part 11a is one of the left screw and the right screw as described above. The second ball screw groove 11b2 of the second ball screw part 11b is the other of the left screw and the right screw. That is, the first ball screw groove 11a2 and the second ball screw groove 11b2 are provided in the turning shaft 11 so as to have the relation of right and left screws (opposite screws). Moreover, the first electric motor 15 and the second electric motor 16 are fixed to the housing 14 so as to face each other.

Figure 3:
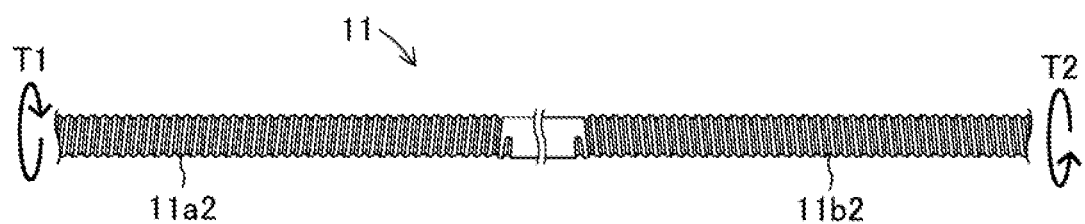
FIG. 3 is a view for explaining a first torque and a second torque.

Here, when the axial direction of the turning shaft 11 from the ball joint 12 toward the ball joint 13 in FIG. 2 is used as a reference, the first electric motor 15 and the second electric motor 16 transmit the first driving force and the second driving force having rotation directions opposite to each other to the first ball screw nut 17 and the second ball screw nut 18. Therefore, the first torque T1 and the second torque T2 acting on the turning shaft 11 have directions opposite to each other as shown in FIG. 3. When rotation directions of the first electric motor 15 and the second electric motor 16 are seen from the first electric motor 15 and the second electric motor 16 on the basis of themselves, the first driving force and the second driving force has the same rotation direction.

Incidentally, absolute values of the first torque T1 and the second torque T2 can be equal to each other when the first electric motor 15 and the second electric motor 16 transmit the first driving force and the second driving force to the first ball screw nut 17 and the second ball screw nut 18. Accordingly, the first torque T1 and the second torque T2 completely cancel each other, thereby moving the turning shaft 11 in the axial direction and turning the left and right front wheels FW1, FW2 without generating rotation in the turning shaft 11.

Specifically, a reduction ratio at which the first ball screw nut 17 performs transmission to the first ball screw groove 11a2 while reducing the rotation speed and converting the force into a linear motion is set to a first reduction ratio G1, and a reduction ratio in which the second ball screw nut 18 performs transmission to the second ball screw groove 11b2 while reducing the rotation speed and converting the force into the linear motion is set to a second reduction ratio G2. Assume that a reduction ratio among the pulley 15a, the belt 15b, the pulley 15d, and the first ball screw nut 17, and reduction ratios among the pulley 16a, the belt 16b, the pulley 16d, and the second ball screw nut 18 are the same.

The first driving force and the second driving force generated by the first electric motor 15 and the second electric motor 16 are transmitted to the first ball screw groove 11a2 and the second ball screw groove 11b2 through the first ball screw nut 17 and the second ball screw nut 18. Accordingly, the first ball screw part 11a applies the first torque T1 to the turning shaft 11 and the second ball screw part 11b applies the second torque T2 to the turning shaft 11. In the case where the first reduction ratio G1 and the second reduction ratio G2 are equal to each other, absolute values of the first torque T1 and the second torque T2 acting on the turning shaft 11 become equal and acting directions become opposite to thereby cancel each other by making the first driving force and the second driving force equal. Therefore, the generation of rotation in the turning shaft 11 can be prevented at the time of moving the turning shaft 11 in the axial direction or at the time of stopping the turning shaft 11 at an arbitrary position in the axial direction.

On the other hand, when the first reduction ratio G1 differs from the second reduction ratio G2, the first electric motor 15 and the second electric motor 16 generate the first driving force and the second driving force so that absolute values of the first torque T1 and the second torque T2 that can be calculated in advance based on the first reduction ratio G1 and the second reduction ratio G2 become equal. Accordingly, the generation of rotation in the turning shaft 11 can be prevented at the time of moving the turning shaft 11 in the axial direction or at the time of stopping the turning shaft 11 at an arbitrary position in the axial direction.

Here, when the first reduction ratio G1 and the second reduction ratio G2 can be the same in a case where, for example, a lead of the rolling passage 11a3 in the first ball screw part 11a and a lead of the rolling passage 11b3 in the second ball screw part 11b are the same.

1-1. Rotation Regulating Part 19

The turning device 10 includes a rotation regulating part 19 at a central part of the turning shaft 11, namely, between the first ball screw part 11a and the second ball screw part 11b provided on both ends of the turning shaft 11 (see FIG. 2). The rotation regulating part 19 is a rotation stopping mechanism that mechanically stops relative rotation of the turning shaft 11 with respect to the housing 14.

That is, the rotation regulating part 19 is provided mainly for preventing relative rotation of the turning shaft 11 with respect to the housing 14 if a state in which one of the first electric motor 15 and the second electric motor 16 fails and becomes inoperable, and one of the above-described first torque T1 and the second torque T2 is not generated occurs. However, the situation is not limited to the above, and the rotation regulating part 19 can regulate relative rotation of the turning shaft 11 with respect to the housing 14 also in a case where a state in which absolute values of the above-described first torque T1 and the second torque T2 do not become completely equal and outputted with a slight difference.

The rotation regulating part 19 includes a protrusion 21 provided in the turning shaft 11 (corresponding to a turning shaft side engaging part and one) and a groove 23 provided in the housing 14 and engaged with part of the protrusion 21 (corresponding to a housing side engaging part, and the other). When the protrusion is engaged with the groove 23, a side surface of the protrusion abuts on a side surface in the inside of the groove 23. The groove 23 is engaged with the protrusion 21 in this manner, which allows relative movement of the turning shaft 11 with respect to the housing 14 in the axial direction as well as regulates relative rotation of the turning shaft 11 with respect to the housing 14 around its central axis.

Specifically, the protrusion 21 is provided to protrude on an annular member outer peripheral surface 22a of an annular member 22 fixed to the turning shaft 11 so that an outer peripheral surface thereof is fitted to an outer peripheral surface 11c (see FIG. 4) of the turning shaft 11. That is, the protrusion 21 is provided to protrude from the outer peripheral surface 22a of the annular member 22 toward an outer side of the turning shaft 11 in a radial direction. Then, an inner peripheral surface of the annular member 22 is fitted to the outer peripheral surface of the turning shaft 11 to be fixed to the turning shaft 11.

In this case, an outer diameter of the outer peripheral surface 11c of the turning shaft 11 to which the annular member 22 is fitted is formed to be slightly larger than an outer diameter of an outer peripheral surface 11d (see FIG. 5) other than the outer peripheral surface 11c to which the annular member 22 is fitted in the turning shaft 11. Accordingly, the inner peripheral surface of the annular member 22 can be easily pressed (fitted) into the outer peripheral surface 11c of the turning shaft 11, and the annular member 22 can be integrally fixed with the turning shaft 11. When forming the protrusion 21, the fixing method in which the annular member 22 having the protrusion 21 is fitted to a fitting portion of the turning shaft outer peripheral surface 11c having the diameter larger than the outer diameter of the turning shaft outer peripheral surface other than the fitting portion is adopted; therefore, it is possible to prevent reduction in bending strength of the turning shaft 11 as compared with a case of applying a fixing method in which a hole is opened in the turning shaft 11 and a protrusion separately formed is fitted to the hole.

Figure 5:
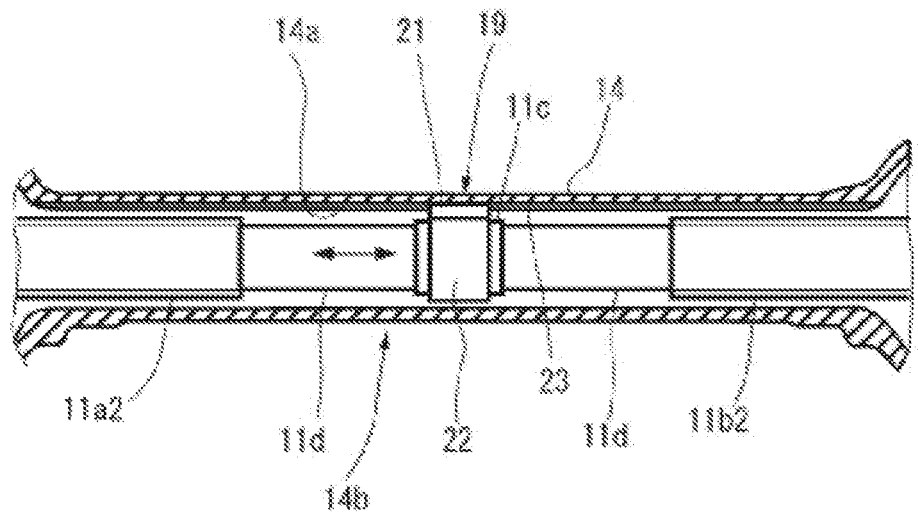
FIG. 5 is a perspective view of the rotation regulating part seen from Q-direction in FIG. 4.

Then, in the embodiment, the protrusion 21 is provided to protrude in one place at an arbitrary position in a circumferential direction on the annular member outer peripheral surface 22a of the annular member 22. As shown in FIG. 5, the protrusion 21 is formed to extend for a prescribed length in the axial direction of the turning shaft 11. The length thereof may be set so as to satisfy the function of stopping rotation, strength and durability of the turning shaft 11 and satisfy conditions such that the turning shaft 11 does not interfere with an unintended place inside the turning device 10 when the turning shaft 11 moves full stroke.

Next, the groove 23 will be explained. The groove 23 (corresponding to the housing side engaging part) is provided on an inner peripheral surface 14a of the housing 14 so as to extend in the axial direction. In this case, a depth of the groove 23 from the inner peripheral surface 14a may be set to have a gap between a tip end of the protrusion 21 and a bottom surface of the groove 23 or the tip end abuts on the bottom surface with a low surface pressure. According to the structure, the groove 23 is engaged with the protrusion 21, allowing relative movement of the housing 14 and the turning shaft 11 in the axial direction. The groove 23 is also engaged with the protrusion 21 to regulate relative rotation of the turning shaft 11 with respect to the housing 14 around the axis. The details will be described later.

The groove 23 is formed so as to pierce through (communicate with) both ends of a central part 14b with the smallest inner diameter in the inner peripheral surface of the housing 14 in the axial direction, as shown in FIG. 5. The groove 23 is not limited to the above state, and the groove 23 may be formed so as to pierce through any one end of both ends of the central part 14b in the axial direction. Also according to this, when the turning shaft 11 is assembled to the inside of the housing 14, the protrusion 21 is inserted into any one end of both ends of the central part 14b through which the groove 23 pierces in the axial direction, thereby assembling the turning shaft 11 to the housing 14.

Figure 4:
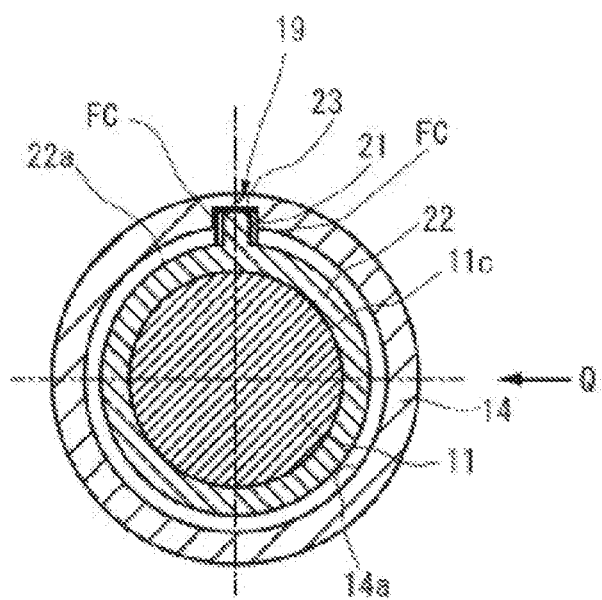
FIG. 4 is a cross-sectional view with respect to arrows IV-IV in a rotation regulating part described in FIG. 2.

As described above, the rotation regulating part 19 is provided so as to extend over the housing 14 and the turning shaft 11 as shown in FIG. 4 and FIG. 5. That is, one of the components of the rotation regulating part 19 is provided on the housing 14, the other of components of the rotation regulating part 19 is provided on the turning shaft 11, and both components are combined with each other to realize the function of the rotation regulating part 19. Accordingly, the rotation regulating part 19 allows relative movement of the turning shaft 11 with respect to the housing 14 in the axial direction as well as regulates relative movement of the turning shaft 11 around the axis with respect to the housing 14.

Also in the embodiment, a fluorine resin coating FC with lubricity is applied to a surface of the protrusion 21 as an example (see FIG. 4). That is, the fluorine resin coating FC as a lubricating part is interposed between the protrusion 21 and the groove 23. Accordingly, when the turning shaft 11 moves with respect to the housing 14 in the axial direction, a frictional force between the protrusion 21 and the groove 23 is reduced and the turning shaft 11 can move smoothly.

Although the explanation has been made that the fluorine resin coating FC is formed on the surface of the protrusion 21, the arrangement is not limited to this. The fluorine resin coating FC may be formed on a surface of the groove 23 facing the protrusion 21 to be engaged. Moreover, the fluorine resin coating FC may be formed on both surfaces of the protrusion 21 and the groove 23 facing the protrusion 21. Also according to this, the same effect as the above embodiment can be expected.

Although the explanation has been made that the lubricating part provided between the protrusion 21 and the groove 23 is the fluorine resin coating FC, the lubricating part is not limited to this. Any resin coating can be adopted as long as the coating has lubricity. It is also preferable that a solid lubricant such as not-shown molybdenum disulfide or graphite may be interposed as the lubricating part between the protrusion 21 and the groove 23. It is also possible that liquid lubricant (not shown) such as grease with high viscosity is interposed as the lubricating part between the protrusion 21 and the groove 23.

Furthermore, a bearing member formed by impregnating a porous material such as sintered metal, grown cast iron or synthetic resin with a lubricating oil may be interposed as the lubricating part between the protrusion 21 and the groove 23. In this case, the impregnated oil is expanded by the increase of temperature at the time of driving. Accordingly, the lubricating oil oozes and is supplied to a gap between the protrusion 21 and the groove 23 to provide a lubricating effect. As the lubricating oil returns to the inside of the bearing member again when the temperature is decreased, long-term use can be realized. Also according to the above, the same effect as the above embodiment can be expected. It is also preferable that the protrusion 21 is provided in the housing 14 to extend to the inner side in the radial direction and the groove 23 is provided in the turning shaft 11, not limited to the above state. Also according to the above, the same effect can be expected.

Then, the rotation regulating part 19 is configured so as not to regulate the rotation of the turning shaft 11 and so as not to prevent the movement of the turning shaft 11 in the axial direction during driving in which the first torque T1 and the second torque T2 are controlled so as to cancel each other.

Therefore, the rotation regulating part 19 does not require high strength, and preferably has an inexpensive and simple structure. As described above, the rotation regulating part 19 can be formed of the contact member (protrusion 21) fixed to the central part of the turning shaft 11, a contacted member (groove 23) provided in the housing 14 and so on. That is, the rotation regulating part 19 can sufficiently respond to cost reduction with the simple and inexpensive structure.

Operation of the turning device 10 is totally controlled by tuning controllers S1, S2. The turning controllers S1, S2 are microcomputers including a CPU, a ROM, a RAM and so on as major components, and are configured to input an electrical signal δ indicating a target turning amount for turning the left and right front wheels FW1, FW2 as shown in FIG. 1. A rotation angle θ1 of the first electric motor 15 is inputted to the turning controller S1 from a rotation angle sensor 15c such as a resolver provided in the first electric motor 15. A rotation angle θ2 of the second electric motor 16 is inputted to the turning controller S2 from a rotation angle sensor 16c such as the resolver provided in the second electric motor 16. Here, the rotation angle θ1 and the rotation angle θ2 correspond to a position of the turning shaft 11 in the axial direction, namely, a turning amount.

The turning controllers S1, S2 perform feedback control of the rotation angle θ1 and the rotation angle θ2, namely, the position of the turning shaft 11. Then, the turning controllers S1, S2 perform, for example, PID control of a not-shown drive circuit so that the turning amount of the turning shaft 11 becomes the target turning amount (a target position of the turning shaft) indicated by the electrical signal δ, and supply a drive current I1 to the first electric motor 15 and a drive current I2 to the second electric motor 16. Accordingly, the left and right front wheels FW1, FW2 can turn wheels to a turning amount corresponding to the target turning amount indicated by the electrical signal δ. The turning controllers S1, S2 can perform feedback control of the drive current I1 and the drive current I2 instead of, or in addition to the feedback control of the rotation angle θ1 and the rotation angle θ2.

1-2. Operation of the Turning Device 10

The turning controllers S1, S2 supply the drive current I1 and the drive current I2 to the first electric motor 15 and the second electric motor 16 respectively after inputting the electrical signal δ. When the drive current I1 is inputted, the first electric motor 15 transmits the first driving force to the first ball screw nut 17 through the pulley 15a, the belt 15b and the pulley 15d. When the drive current I2 is inputted, the second electric motor 16 transmits the second driving force acting in the same direction as the first driving force to the second ball screw nut 18 through the pulley 16a, the belt 16b and the pulley 16d.

When the first ball screw nut 17 transmits the first driving force from the first electric motor 15 to the first ball screw groove 11a2 of the turning shaft 11, the first torque T1 is converted into the axial force of the turning shaft 11 in the first ball screw part 11a. When the second ball screw nut 18 transmits the second driving force from the second electric motor 16 to the second ball screw groove 11b2 of the turning shaft 11, the second torque T2 is converted into the axial force of the turning shaft 11 in the second ball screw part 11b.

Incidentally, the first electric motor 15 and the second electric motor 16 are arranged so as to face each other. Accordingly, in a case where the first driving force and the second driving force to be the same direction when seen from the first electric motor 15 and the second electric motor 16 on the basis of themselves are generated, the first ball screw nut 17 and the second ball screw nut 18 rotate in opposite directions to each other with respect the turning shaft 11. Here, the rolling passage 11a3 of the first ball screw part 11a and the rolling passage 11b3 of the second ball screw part 11b have the relation of left and right screws (opposite screws). Accordingly, when the first ball screw nut 17 and the second ball screw nut 18 rotate in opposite directions to each other, the axial force in the same direction, namely, the turning force is generated in the turning shaft 11 in the axial direction. Accordingly, the turning shaft 11 moves in the axial direction and turns the left and right front wheels FW1, FW2.

In this case, the turning controller S1 performs feedback control of the rotation angle θ1 outputted from the rotation angle sensor 15c of the first electric motor 15, namely, the position of the turning shaft 11 in the axial direction, performing the PID control of the drive current I1 until the turning amount becomes the target turning amount indicated by the electrical signal δ to drive the first electric motor 15. The turning controller S2 performs feedback control of the rotation angle θ2 outputted from the rotation angle sensor 16c of the second electric motor 16, namely, the position of the turning shaft 11 in the axial direction, performing the PID control of the drive current I2 until the turning amount becomes the target turning amount indicated by the electrical signal δ to drive the second electric motor 16.

Incidentally, the turning controllers S1, S2 control, for example, the drive current I1 and the drive current I2 so that absolute values of the first torque T1 generated in the turning shaft 11 and the second torque T2 generated in the opposite direction to the first torque T1 become equal when moving the turning shaft 11 in the axial direction. Accordingly, the first torque T1 and the second torque T2 cancel each other, thereby preventing generation of rotation such as relative rotation with respect to the housing 14 in the turning shaft 11.

However, in the case where any one of the first electric motor 15 and the second electric motor 16 fails, a balance between the first torque T1 and the second torque T2 is lost. Therefore, the turning shaft 11 receives a force of relatively rotating around the axis with respect to the housing 14 by a torque T (the first torque T1 or the second torque T2) of the motor that is not failed (the first electric motor 15 or the second electric motor 16).

However, the rotation regulating part 19 is provided in the present embodiment. Therefore, when the turning shaft 11 receives the rotational force around the axis, one side surface of the protrusion 21 contacts one side surface in the groove 23 engaged through the fluorine resin coating FC (lubricating part) to regulate relative rotation of the turning shaft 11 around the axis with respect to the housing 14. Accordingly, while regulating rotation of the turning shaft 11 due to the torque T (the first torque T1 or the second torque T2) of the motor that is not failed (the first electric motor 15 or the second electric motor 16), the torque T is converted into the axial force by the first ball screw part 11a or the second ball screw part 11b and applied to the turning shaft 11, thereby moving the turning shaft 11 in the axial direction with respect to the housing 14.

As described above, even when any one of the first electric motor 15 and the second electric motor 16 fails, a vehicle can be steered and moved to a safe place only by the torque T (the first torque T1 or the second torque T2) of the motor that is not failed (the first electric motor 15 or the second electric motor 16); therefore, reliability can be improved. Moreover, the lubricating part (fluorine resin coating FC) is interposed between the protrusion 21 and the groove 23 in the rotation regulating part 19. Accordingly, the protrusion 21 slides smoothly without resistance in the groove 23 in the axial direction.

2. Steering Device Using Turning Device 10

Figure 6:
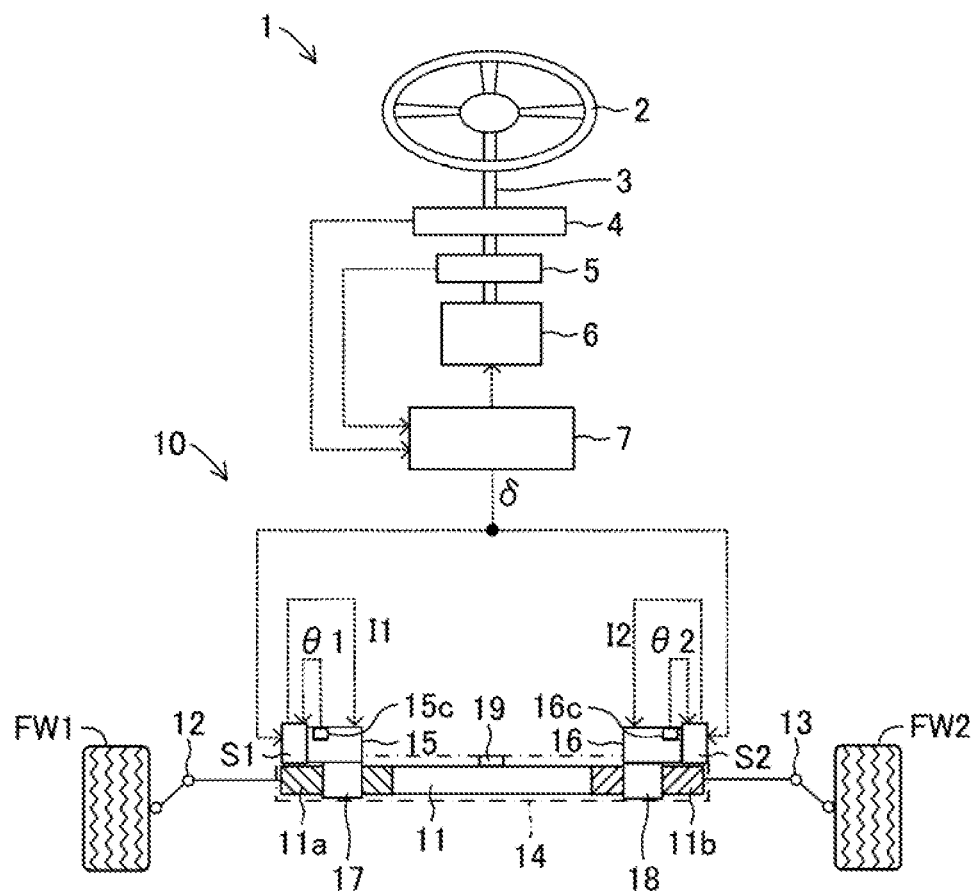
FIG. 6 is an entire view showing a structure of a steering device to which the turning device is applied.

The above turning device 10 can be applied to a steer-by-wire steering device 1 as shown in FIG. 6. The steering device 1 includes a steering wheel 2 operated to be rotated by a driver. The steering wheel 2 is fixed to an upper end of a steering input shaft 3. A steering angle sensor 4, a steering torque sensor 5 and a reaction-force actuator 6 are connected to the steering input shaft 3.

The steering angle sensor 4 detects an operation amount of the steering wheel 2, namely, a rotation angle of the steering input shaft 3 as a steering angle, and outputs the steering angle to a steering controller 7. The steering torque sensor 5 detects the operation amount of the steering wheel 2, namely, a torque inputted to the steering input shaft 3 as a steering torque, and outputs the steering torque to the steering controller 7. The reaction-force actuator 6 includes an electric motor and a reduction mechanism, giving a prescribed reaction force with respect to a rotation operation of the steering wheel 2 by the driver.

The steering controller 7 includes a microcomputer having a CPU, a ROM, a RAM and so on as major components, and a motor drive circuit, inputting the steering angle and the steering torque detected by the steering angle sensor 4 and the steering torque sensor 5 to control operation of the reaction-force actuator 6. That is, the steering controller 7 controls operation of the reaction-force actuator 6 so as to generate a reaction force corresponding to the steering angle and the steering torque. The control of the reaction-force actuator 6 by the steering controller 7 does not directly relate to the present invention; therefore, the explanation thereof is omitted.

The steering controller 7 calculates the target turning amount of the left and right front wheels FW1, FW2 based on at least one of the inputted steering angle and the steering torque. Then, the steering controller 7 outputs the electrical signal δ indicating the calculated target turning amount to the steering controllers S1, S2 of the turning device 10. Accordingly, the turning controllers S1, S2 drive the first electric motor 15 as the first driving source and the second electric motor 16 as the second driving source as described above based on the electrical signal δ inputted from the steering controller 7. Therefore, the turning device 10 can be applied to the steer-by-wire steering device 1.

The turning device 10 may be applied to a vehicle with an autonomous driving function, for example, a vehicle not having the steering wheel operated by the driver, or a vehicle in which the steering wheel is normally housed. In the vehicle with the autonomous driving function, for example, a destination is set by a crew, and a route to the destination is searched by using map data mounted on the vehicle or map data accumulated in a map database of an outside center.

Then, the vehicle with the autonomous driving function moves to a destination by driving, for example, based on route data indicating the searched route and current position data indicating a current position of the vehicle. In this case, the electrical signal δ indicating the target turning amount of the left and right front wheels FW1, FW2 which can be calculated based on the route data and the current position data from a host controller totally controlling autonomous driving, for example, at the time of running on a curve existing in a front travelling direction. Accordingly, the turning controllers S1, S2 drive the first electric motor 15 as the first driving source and the second electric motor 16 as the second driving source as described above based on the electrical signal δ inputted from the host controller. Therefore, the turning device 10 can be applied to the vehicle with the autonomous driving function.

As can be seen from the above explanation, the turning device 10 according to the embodiment includes the hollow housing 14, the turning shaft 11 housed inside the housing 14, having the first ball screw groove 11a2 as the first male screw groove formed by one threading manner of the left screw and the right screw and the second ball screw groove 11b2 as the second male screw groove formed by the other threading manner of the left screw and the right screw, and turning the left and right front wheels FW1, FW2 as left and right wheels to be turned by moving in the axial direction, the first ball screw nut 17 as the first nut screwed to the first ball screw groove 11a2 and rotatably supported inside the housing 14, the second ball screw nut 18 as the second nut screwed to the second ball screw groove 11b2 and rotatably supported inside the housing 14, the first electric motor 15 as the first driving source generating the first driving force, and the second electric motor 16 as the second driving source operating independently of the first electric motor 15 and generating the second driving force, transmitting the first driving force generated by the first electric motor 15 to the first ball screw nut 17 and giving the axial force to the turning shaft 11 having the first ball screw groove 11a2 by rotating the first ball screw nut 17, and transmitting the second driving force generated by the second electric motor 16 to the second ball screw nut 18 and giving the axial force to the turning shaft 11 having the second ball screw groove 11b2 by rotating the second ball screw nut 18.

According to the above, the first ball screw nut 17 is capable of transmitting the first driving force from the first electric motor 15 to the turning shaft 11 having the first ball screw groove 11a2 (the first ball screw part 11a) and the second ball screw nut 18 is capable of transmitting the second driving force from the second electric motor 16 to the turning shaft 11 having the second ball screw groove 11b2 (the second ball screw part 11b). The first ball screw groove 11a2 is one of the left screw and the right screw and the second ball screw groove 11b2 is the other of the left screw and the right screw; therefore, the first ball screw groove 11a2 and the second ball screw groove 11b2 have the relation of left and right screws (opposite screws).

Accordingly, when the turning shaft 11 is moved in the axial direction, the first torque T1 and the second torque T2 that cancel each other can be generated in the first ball screw part 11a and the second ball screw part 11b by the transmitted first driving force and the second driving force. Therefore, the turning shaft 11 can be moved in the axial direction, that is, the left and right front wheels FW1, FW2 can be turned while preventing the turning shaft 11, the first ball screw nut 17 and the second ball screw nut 18 from rotating together around the axis. Accordingly, the turning device 10 can be reduced in cost and reduced in size.

The first electric motor 15 and the second electric motor 16 are configured, in corporation with each other, to transmit the first driving force and the second driving force to be the same direction on the basis of the motors themselves to the turning shaft 11 through the first ball screw nut 17 and the second ball screw nut 18 so as to move the turning shaft 11 in the axial direction.

According to this, the first torque T1 and the second torque T2 that cancel each other can be positively generated in the first ball screw part 11a and the second ball screw part 11b to thereby move the turning shaft 11 in the axial direction. That is, the left and right front wheels FW1, FW2 can be turned. Therefore, the turning shaft 11 can be positively moved in the axial direction to turn the left and right front wheels FW1, FW2 while preventing the turning shaft 11, the first ball screw nut 17 and the second ball screw nut 18 from rotating together around the axis.

The turning shaft 11 is housed in the hollow housing 14 and is provided with the first ball screw part 11a and the second ball screw part 11b at both ends, in which the rotation regulating part 19 that regulates relative rotation of the turning shaft 11 with respect to the housing 14 can be provided.

According to the above, the rotation regulating part 19 can be arranged so as not to regulate the rotation of the turning shaft 11 at all in a normal state when the first torque T1 and the second torque T2 are generated. Accordingly, the rotation regulating part 19 may have a simple structure. Even when the rotation regulating part 19 has the simple structure, relative rotation of the turning shaft 11 with respect to the housing 14 can be temporarily regulated, for example, in a state where one of the first electric motor 15 and the second electric motor 16 fails. Therefore, the turning device 10 can be inexpensive and can be redundantly provided with a structure in which relative rotation of the turning shaft 11 with respect to the housing 14 is mechanically prevented in addition to the generation of the first torque T1 and the second torque T2.

In the turning device 10, absolute values of the first torque T1 added to the turning shaft 11 in the first ball screw part 11a by the first driving force transmitted to the first ball screw nut 17 and the second torque T2 added to the turning shaft 11 in the second ball screw part 11b by the second driving force transmitted to the second ball screw nut 18 are equal. Then, the first electric motor 15 and the second electric motor 16 generate the first driving force and the second driving force so that the absolute values of the first torque T1 and the second torque T2 become equal at the time of moving the turning shaft 11 in the axial direction in the turning device 10. Moreover, absolute values of the first driving force and the second driving force are equal as well as the first reduction ratio G1 at which the first ball screw nut 17 performs transmission to the first ball screw groove 11a2 while reducing the rotation speed and converting the force into the linear motion and the second reduction ratio G2 at which the second ball screw nut 18 performs transmission to the second ball screw groove 11b2 while reducing the rotation speed and converting the force into the linear motion are equal.

According to the above, the first torque T1 and the second torque T2 that cancel each other can be positively generated in the first ball screw part 11a and the second ball screw part 11b, and can positively move the turning shaft 11 in the axial direction. That is, the left and right front wheels FW1, FW2 can be positively turned. Therefore, it is possible to prevent the turning shaft 11, the first ball screw nut 17 and the second ball screw nut 18 from rotating together around the axis in good condition and to move the turning shaft 11 in the axial direction more positively, thereby turning the left and right front wheels FW1, FW2.

In the above case, the first ball screw nut 17 corresponds to a first screwing member (first nut) screwing to the first ball screw groove 11a2 and the second ball screw nut 18 corresponds to a second screwing member (second nut) screwing to the second ball screw groove 11b2.

The first ball screw nut 17 and the second ball screw nut 18 that have a simple structure and are relatively inexpensive can be used as the first screwing member and the second screwing member. Accordingly, manufacturing costs of the turning device 10 can be reduced and the turning device 10 can be provided at a low price.

Also in the turning device 10, external dimensions of a portion of the housing 14 that houses the rotation regulating part 19 are suppressed to be remarkably smaller than a pinion-shaft housing part in a housing of a related-art EPS gear, and the inexpensive rotation regulating part 19 is provided. Accordingly, the turning device 10 can be manufactured at low cost as well as the turning device 10 can be reduced in size. Furthermore, in the turning device 10, even when any one motor (driving source) of the first electric motor 15 and the second electric motor 16 fails, the turning shaft 11 can be moved in the axial direction in the state where relative rotation of the turning shaft 11 with respect to the housing 14 is regulated in good condition in the rotation regulating part 19. Accordingly, wheel-turning can be controlled in good manner and reliability is improved. That is, the vehicle can be moved to a safe place positively even when one of the driving sources fails.

In the normal state in which the first torque T1 and the second torque T2 are generated, the rotation regulating part 19 can be arranged so as not to regulate the rotation of the turning shaft 11 at all. Accordingly, the rotation regulating part 19 may have a simple structure. Then, even when the rotation regulating part 19 has the simple structure, relative rotation of the turning shaft 11 with respect to the housing 14 can be temporarily regulated, for example, in a case where one of the first electric motor 15 and the second electric motor 16 fails. Therefore, the turning device 10 can be inexpensive and can be redundantly provided with a structure in which relative rotation of the turning shaft 11 with respect to the housing 14 is mechanically prevented in addition to the generation of the first torque T1 and the second torque T2.

Also according to the above embodiment, the first electric motor 15 and the second electric motor 16 are configured, in corporation with each other, to transmit the first driving force and the second driving force to be the same direction on the basis of the motors themselves to the turning shaft 11 through the first ball screw nut 17 and the second ball screw nut 18 so as to move the turning shaft 11 in the axial direction. As described above, the movement of the turning shaft 11 in the axial direction is normally controlled in the state where relative rotation with respect to the housing 14 is well controlled without using the rotation regulating part 19.

3. Modification Examples 3-1. First Modification Example

In the above embodiment, the first electric motor 15 as the first driving source and the first ball screw nut 17 as the first screwing member are connected so as to transmit the power through the pulley 15a, the belt 15b and the pulley 15d. Moreover, the second electric motor 16 as the second driving source and the second ball screw nut 18 as the second screwing member are connected so as to transmit the power through the pulley 16a, the belt 16b and the pulley 16d. That is, the output shaft of the first electric motor 15 and the output shaft of the second electric motor 16 are formed to be parallel to the turning shaft 11.

Figure 7:
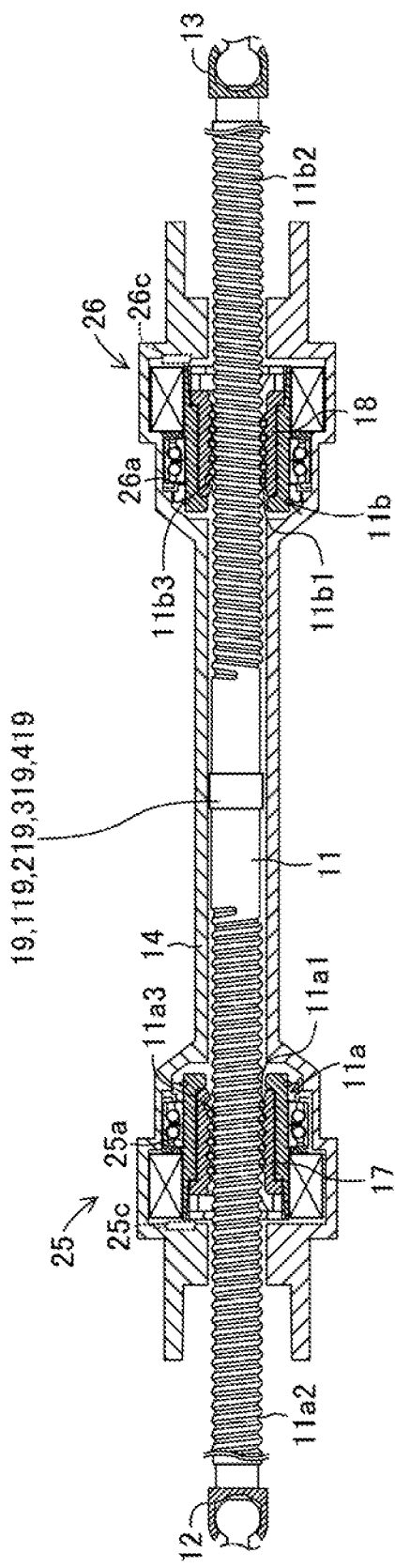
FIG. 7 is a cross-sectional view showing a structure of a turning device according to a first modification example in detail.

It is possible to arrange a first electric motor 25 and a second electric motor 26 formed in the same manner as the first electric motor 15 and the second electric motor 16 so as to be coaxial with the turning shaft 11 as shown in FIG. 7 instead of the above structure. Then, the first driving force and the second driving force can be directly transmitted to the first ball screw nut 17 and the second ball screw nut 18. That is, a rotor 25a of the first electric motor 25 is integrally connected to the first ball screw nut 17, and a rotor 26a of the second electric motor 26 is integrally connected to the second ball screw nut 18.

As described above, the turning device 10 operates in the same manner as the above embodiment also in the case where the first electric motor 25 and the second electric motor 26 are arranged coaxially with the turning shaft 11. Therefore, the same effect as the above embodiment can be obtained, and further size reduction of the turning device 10 particularly in a radial direction of the turning shaft 11 is possible in the first modification example.

3-2. Second Modification Example

In the above embodiment and the first modification example, the first ball screw groove 11a2 as the first male screw groove and the second ball screw groove 11b2 as the second male screw groove are provided. Also in the above embodiment and the first modification example, the first ball screw nut 17 as the first nut and the second ball screw nut 18 as the second nut are provided. Then, the balls 11a1 and the balls 11b1 as the spherical rolling elements are configured to roll on the rolling passage 11a3 and the rolling passage 11b3 of the ball screws.

Figure 8:
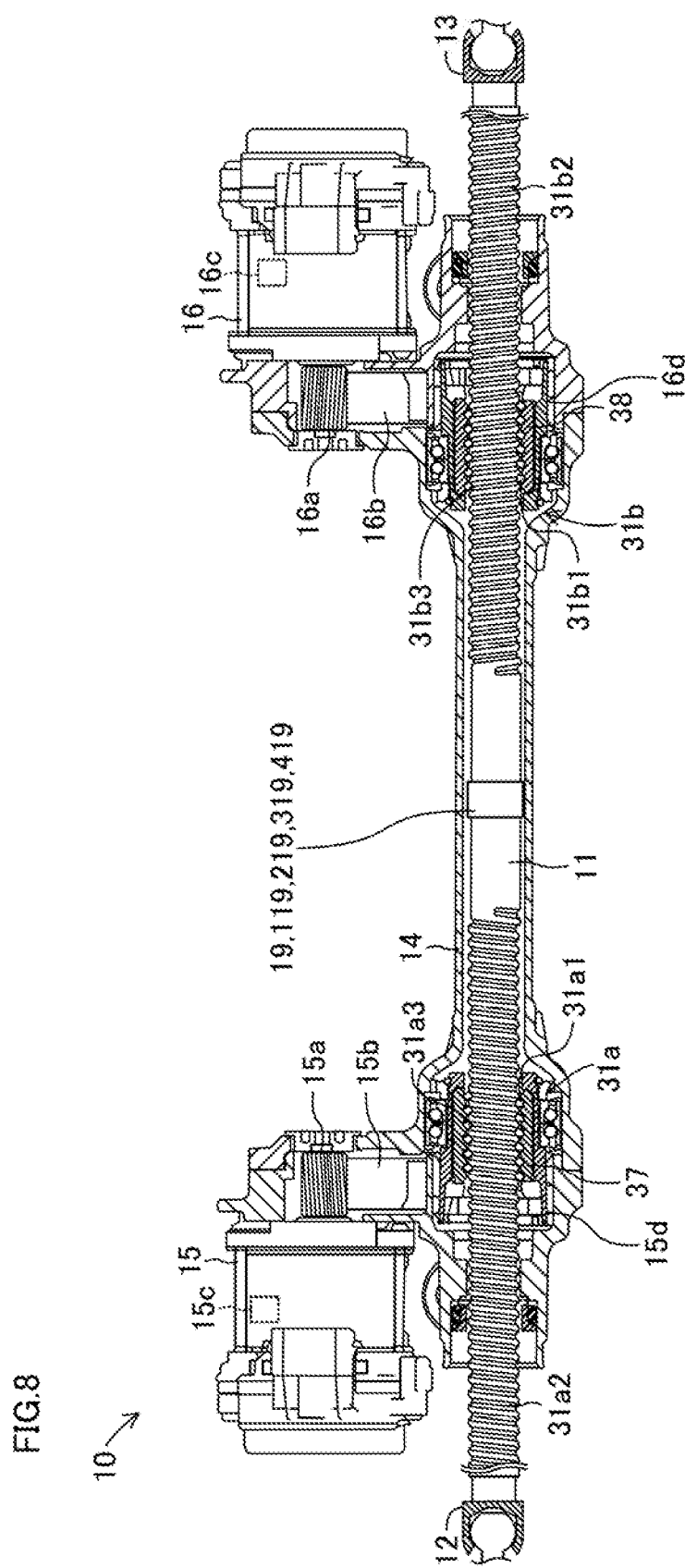
FIG. 8 is a cross-sectional view showing a structure of a turning device according to a second modification example in detail.

It is possible to provide a first roller screw groove 31a2 as the first male screw groove and a second roller screw groove 31b2 as a second male screw groove as shown in FIG. 8 as an example of the embodiment instead of the above. In this case, a first roller screw nut 37 as the first nut (first screwing member) and a second roller screw nut 38 as the second nut (second screwing member) can be provided. Then, a roller 31a1 and a roller 31b1 as roller-type rolling elements roll on a rolling passage 31a3 and a rolling passage 31b3 of the roller screws in a second modification example. Therefore, the same effect as the embodiments and the first modification example can be obtained also in the second modification example.

3-3. Third Modification Example

In the above embodiment and the first modification example, the first ball screw groove 11a2 as the first male screw groove and the second ball screw groove 11b2 as the second male screw groove are provided. Also in the above embodiment and the first modification example, the first ball screw nut 17 as the first nut (first screwing member) and the second ball screw nut 18 as the second nut (second screwing member) are provided. Then, in the above embodiment and the first modification example, the balls 11a1 and the balls 11b1 as the spherical rolling elements are configured to roll on the rolling passage 11a3 and the rolling passage 11b3 of the ball screws.

In the second modification example, the first roller screw groove 31a2 as the first male screw groove and the second roller screw groove 31b2 as the second male screw groove are provided. Also in the second modification example, the first roller screw nut 37 as the first nut (first screwing member) and the second roller screw nut 38 as the second nut (second screwing member) are provided. Then, the roller 31a1 and the roller 31b1 as roller-type rolling elements roll on the rolling passage 31a3 and the rolling passage 31b3 of the roller screws in the second modification example.

Figure 9:
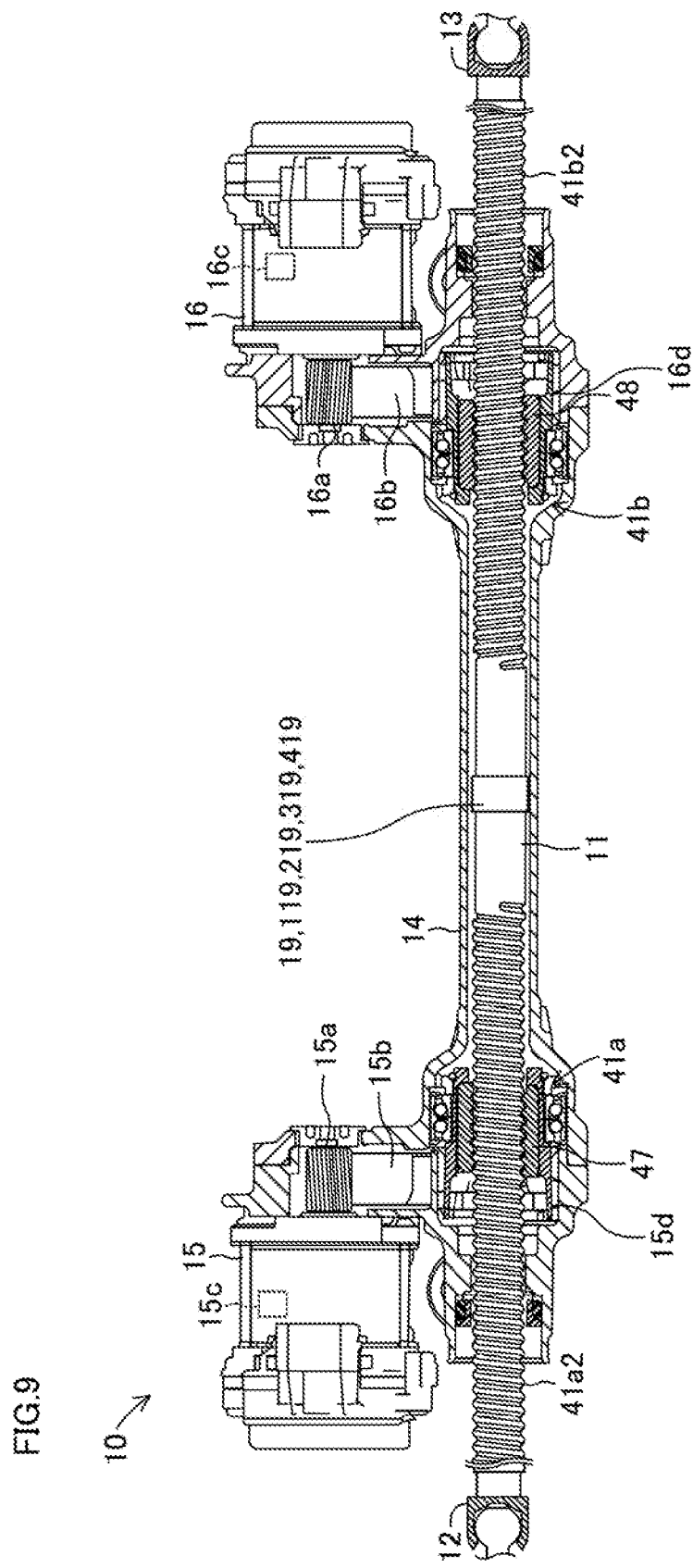
FIG. 9 is a cross-sectional view showing a structure of a turning device according to a third modification example in detail.

It is possible to provide a first sliding screw part 41a having a trapezoidal screw groove 41a2 as a first male screw groove and a second sliding screw part 41b having a trapezoidal screw groove 41b2 as a second male screw groove as shown in FIG. 9 as an example of the embodiment instead of the above. In this case, a first sliding screw nut 47 as a first nut (first screwing member) and a second sliding screw nut 48 as a second nut (second screwing member) can be provided. Then, in a third modification example, the first sliding screw nut 47 and the second sliding screw nut 48 relatively move while sliding on the trapezoidal screw groove 41a2 of the first sliding screw part 41a and the trapezoidal screw groove 41b2 of the second sliding screw part 41b together with the rotation. Therefore, the same effect as the above embodiment and the respective modification examples can be obtained also in the third modification example.

3-4. Fourth Modification Example

Figure 10:
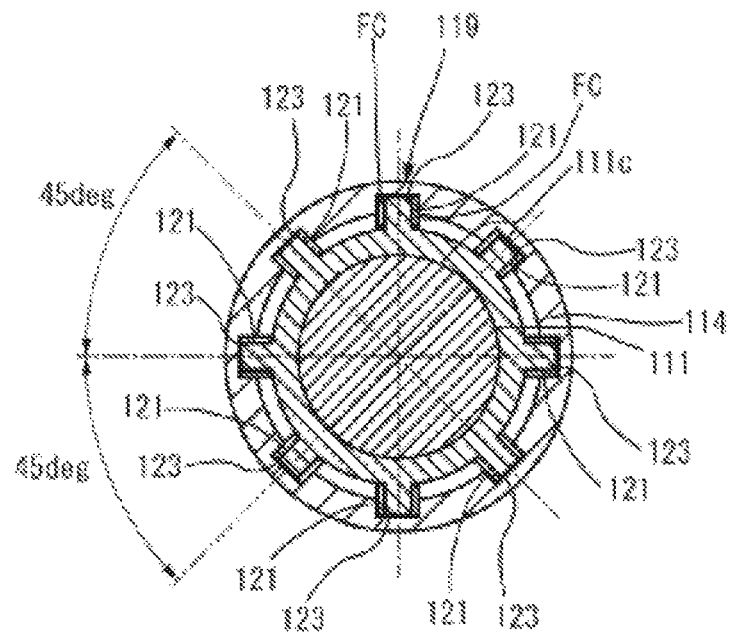
FIG. 10 is a view showing a rotation regulating part corresponding to FIG. 4 according to a fourth modification example.

In the above embodiment and the respective modification examples, explanation has been made that the rotation regulating part 19 forms the protrusion 21 and the groove 23 only at one place in an arbitrary part in the circumferential direction on the outer peripheral surface of the turning shaft 11. However, the rotation regulating part 19 is not limited to this state. As a fourth modification example as shown in FIG. 10, plural (for example, eight) protrusions 121 and grooves 123 may be provided in a rotation regulating part 119 at equal angular intervals (for example, at intervals of 45 degrees) around the axis of a turning shaft 111. Note that 45 degrees and eight protrusions and grooves are just examples, which can be arbitrarily set.

When the plural protrusions 121 and the grooves 123 are arranged at equal angular intervals around the axis of the turning shaft 111 as described above, the same effect as the above embodiment can be obtained and the turning shaft 111 can be stably arranged in a position of an axial center inside a housing 114. As the plural protrusions 121 and the grooves 123 are provided, a shared load assigned to each protrusion 121 when abutting on aside surface of the inside of the groove 123 is reduced at the time of regulating relative rotation of the turning shaft 111 around the axis with respect to the housing 114, as a result, durability is improved.

3-5. Fifth Modification Example

Figure 11:
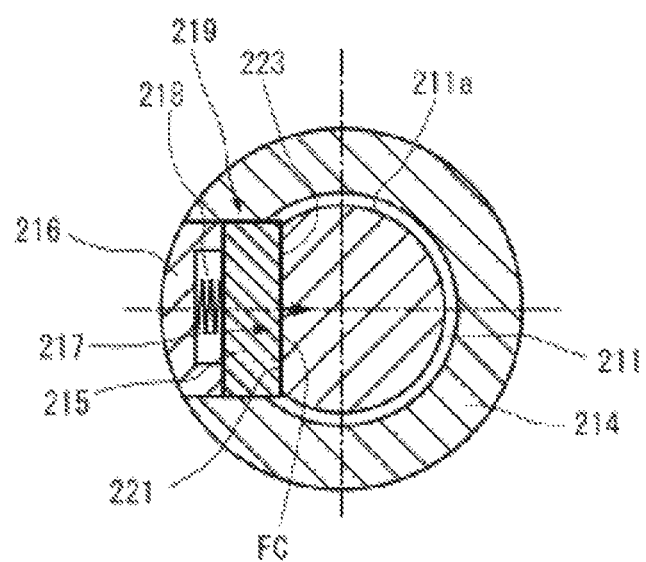
FIG. 11 is a view showing a rotation regulating part corresponding to FIG. 4 according to a fifth modification example.

As a fifth modification example of the above embodiment, a rotation regulating part 219 may have a turning shaft side engaging part 221 provided in a turning shaft 211 and a housing side engaging part 223 provided on a housing 214, instead of having the protrusions 21, 212 and the grooves 23, 123 as shown in FIG. 11.

As shown in FIG. 11, the turning shaft side engaging part 221 is formed with a curvature different from a columnar outer peripheral surface 211a formed with a given curvature on an outer peripheral surface of the turning shaft 211. That is, a cross-sectional shape of the turning shaft 211 orthogonal to the axis is formed in a D-shape, and a surface formed by a straight line in the D-shape is formed as the turning shaft side engaging part 221. Then, the housing side engaging part 223 is formed on a turning-shaft facing surface that faces the turning shaft side engaging part 221 face to face so as to abut on the turning shaft side engaging part 221. At this time, an engaging part where the turning shaft side engaging part 221 and the housing side engaging part 223 abutting on each other face to face is called an abutting part 217.

It is preferable that any one lubricant of the above explained lubricating parts (the fluorine resin coating FC, the solid lubricant (molybdenum disulfide or graphite) and the liquid lubricant, not shown) is provided between the housing side engaging part 223 and the turning shaft side engaging part 221 in the abutting part 217. Accordingly, the housing side engaging part 223 can slide on the turning shaft side engaging part 221 smoothly in the abutting part 217 at the time of relative movement between the turning shaft 211 and the housing 214 in the axial direction.

To explain an example of the structure of the fifth modification example, the housing side engaging part 223 of the abutting part 217 maybe formed separately from the housing 214 and may be formed on a given surface on a guide member 215 provided in the housing 214 so as to relatively move with respect to the housing 214 as shown in FIG. 11. In this case, the guide member 215 may be formed, for example, in a columnar shape or a cylindrical shape, and the housing side engaging part 223 may be formed on a turning-shaft facing surface (an end surface on the right side in FIG. 11) facing the turning shaft 211. In this case, the guide member 215 is arranged inside the housing 214 as shown in FIG. 11, and a back facing surface of the housing side engaging part 223 is supported by a plug 216 screw-fitted to the housing 214.

In this case, the plug 216 is screw-fitted to a female screw formed in the housing 214. Then, the back facing surface of the housing side engaging part 223 in the guide member 215 is biased to the turning shaft 211 by an end surface of the plug 216 to fix the guide member 215. According to the above structure, the same effect as the above embodiment can be expected.

Also as shown in FIG. 11, a biasing member 218 such as a coil spring may be interposed between the plug 216 and the guide member 215. That is, the magnitude of a biasing force for biasing the guide member 215 to the turning shaft 211 may be controlled to be the given magnitude by the biasing member 218. Accordingly, a sliding resistance between the turning shaft 211 and the housing 214 in the axial direction at the time of relative movement can be controlled with high accuracy and the relative movement can be positively performed.

In the fifth modification example, the housing side engaging part 223 is provided in the guide member 215 formed separately from the housing 214. However, the arrangement is not limited to this state, and the housing side engaging part 223 may be formed in an integrally-formed portion that is integrally formed with the housing 214 (not shown).

3-6. Sixth Modification Example

Figure 12:
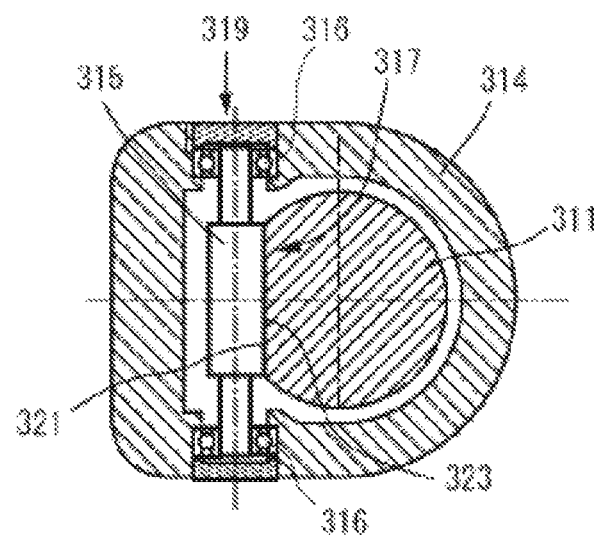
FIG. 12 is a view showing a rotation regulating part corresponding to FIG. 4 according to a sixth modification example.

As a sixth modification example of the above embodiment, a rotation regulating part 319 may include a turning shaft side engaging part 321 provided in a turning shaft 311 and a housing side engaging part 323 provided in a housing 314 as shown in FIG. 12. In this case, the turning shaft side engaging part 321 has the same shape as the shape of the turning shaft side engaging part 221 according to the fifth modification example.

The housing side engaging part 323 is formed on an outer peripheral surface of a columnar roller 315 as shown in FIG. 12. The roller 315 is supported in the housing 314 so that a rotation axis of itself can rotate around the shaft through ball bearings 316 arranged at both ends of the rotation axis. According to the structure, the housing side engaging part 323 as the outer peripheral surface of the roller 315 abuts on the turning shaft side engaging part 321 at an abutting part 317. The abutting part 317 contacts them in a straight line.

Then, the roller 315 rolls on the turning shaft side engaging part 321 at the time of relative movement of the turning shaft 311 in the axial direction with respect to the housing 314, which realize relative movement. The relative rotation of the turning shaft 311 around the axis with respect to the housing 314 is positively regulated by the abutting part 317 abutting in the straight line. Accordingly, the same effect as the above embodiment can be expected.

It is preferable that any one lubricant of the above explained lubricating parts (the fluorine resin coating (not shown), the solid lubricant (molybdenum disulfide or graphite, not shown) and the liquid lubricant (not shown)) is provided between the outer peripheral surface of the roller 315 (the housing side engaging part 323) in the abutting part 317 and the turning shaft side engaging part 321. Accordingly, it is possible to effectively suppress abrasion of the housing side engaging part 323 and the turning shaft side engaging part 321 due to friction in the abutting part 317 at the time of relative movement of the turning shaft 311 and the housing 314 in the axial direction.

3-7. Seventh Modification Example

Figure 13:
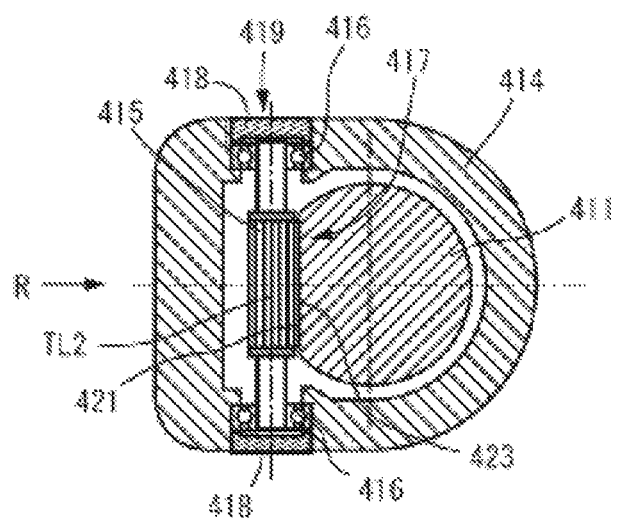
FIG. 13 is a view showing a rotation regulating part corresponding to FIG. 4 according to a seventh modification example.
Figure 14:
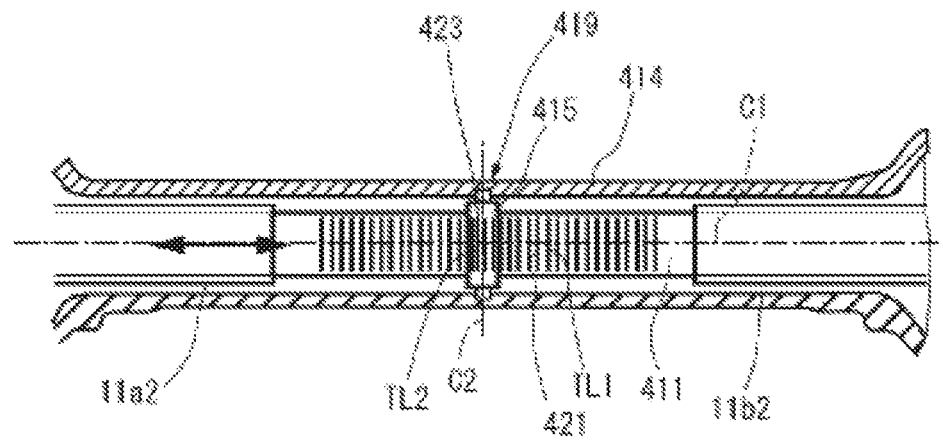
FIG. 14 is a perspective view of the rotation regulating part seen from R-direction in FIG. 13.

As a seventh modification example of the above embodiment, the turning shaft side engaging part may be formed by rack teeth 421 and the housing side engaging part is formed by pinion teeth 423 of a pinion gear 415 engaging with the rack teeth 421 in a rotation regulating part 419 as shown in FIG. 13 and FIG. 14. In the seventh modification example, the pinion gear 415 is formed in a shaft shape as shown in FIG. 13 and FIG. 14, which is supported so that a rotation axis can rotate around an axis of itself on an inner peripheral surface of a housing 414 through ball bearings 416, 416 arranged on both ends. Respective ball bearings 416 are supported and fixed by respective plugs 418 from an outer direction of a rotation axis C2 in the axial direction. As the supporting method by the ball bearings is well known and is not a major element of the present invention, further detailed explanation is not made.

As shown in FIG. 14, in the seventh modification example, the pinion gear 415 of the rotation regulating part 419 is formed so that tooth traces TL2 of the pinion teeth 423 (housing side engaging part) are parallel to the rotation axis C2 (axial center) of the pinion gear 415. The pinion gear 415 is arranged so that the rotation axis C2 is orthogonal to the axial direction of a central axis C1 of the turning shaft 411. The rack teeth 421 (turning shaft side engaging part) of the rotation regulating part 419 is formed so that tooth traces TL1 of the rack teeth 421 are orthogonal to the axial direction of the central axis C1 of the turning shaft 411. The tooth traces TL1 of the rack teeth 421 are formed to be parallel to the tooth traces TL2 of the pinion teeth 423 (housing side engaging part) of the pinion gear 415. Then, the rack teeth 421 are engaged with the pinion teeth 423 so that tooth surfaces abut on each other. In this case, an engaging part between the rack teeth 421 and the pinion teeth 423 tooth surfaces of which abut on each other is called an abutting part 417.

Then, it is preferable that anyone lubricant of the above explained lubricating parts (the fluorine resin coating FC (not shown), the solid lubricant (molybdenum disulfide or graphite, not shown) and the liquid lubricant, (not shown)) is provided between the pinion teeth 423 and the rack teeth 421 in the abutting part 417. Accordingly, it is possible to effectively suppress abrasion of the pinion teeth 423 and the rack teeth 421 due to friction in the abutting part 417 at the time of relative movement of the turning shaft 411 and the housing 414 in the axial direction.

As described above, a large force is not normally added to the abutting part 417. Even in an emergency, it is sufficient to be operated for a short time for an escape. Accordingly, the pinion teeth 423 and the rack teeth 421 do not require large strength. It is also not necessary to form respective teeth of the pinion teeth 423 and the rack teeth 421 to be helical teeth for improving strength and reducing noise in an engagement part. Accordingly, a biasing force in the axial direction is not added to respective gears; therefore, a structure of a gear unit can be simplified and costs can be reduced.

It is also preferable that, while the tooth traces TL2 of the pinion gear 415 are formed to be parallel to the rotation axis C2 of the pinion gear 415, the rotation axis C2 of the pinion gear 415 is allowed to diagonally cross the central axis C1 of the turning shaft 411 in the axial direction and that the tooth traces TL1 of the rack teeth 421 are allowed to diagonally cross the central axis C1 of the turning shaft 411 in the axial direction. Also according to the structure, the pinion gear 415 can be easily manufactured by extrusion molding or the like, which leads to reduction of costs.

According to the above structure, the same effect as the above embodiment can be expected in the turning device 10. That is, even when any one of motors (driving sources) that are the first electric motor 15 and the second electric motor 16 fails, the turning shaft 411 can be smoothly moved in the axial direction in the state where relative rotation of the turning shaft 411 with respect to the housing 414 is well regulated in the rotation regulating part 419. Accordingly, the vehicle can be positively moved to a safety place even when one driving source fails.

In the above fifth modification example, the rotation regulating part 219 includes the turning shaft side engaging part 221 provided in the turning shaft 211 and the housing side engaging part 223 provided on the housing 214. Then, the turning shaft side engaging part 221 and the housing side engaging part 223 abut on each other face to face, thereby allowing relative movement of the turning shaft 211 and the housing 214 in the axial direction and relative rotation of the turning shaft 211 with respect to the housing 214 is regulated.

Figure 15:
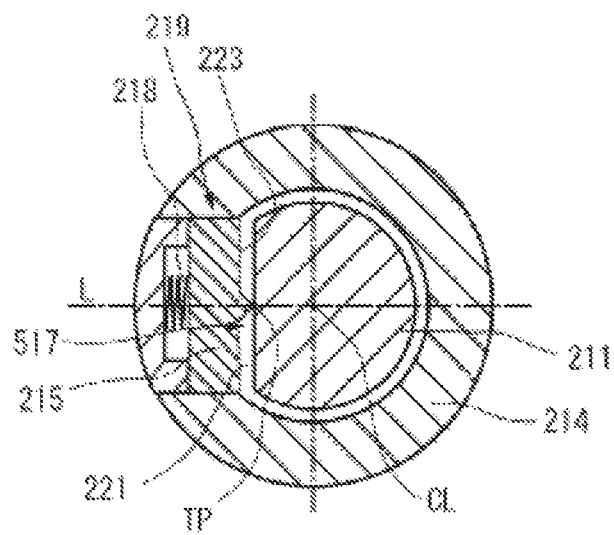
FIG. 15 is a view in a modified state of a rotation regulating part corresponding to the fifth modification example, which corresponds to FIG. 11.

However, the above structure is not limited to this. When the turning shaft side engaging part 221 abuts on the housing side engaging part 223 in the rotation regulating part 219, respective engagement surfaces may be formed so that the turning shaft side engaging part 221 and the housing side engaging part 223 abut on each other at least at one point and engaged with each other as shown in FIG. 15. FIG. 15 shows a state where the housing side engaging part 223 abuts on the turning shaft side engaging part 221 at one point. In this case, the turning shaft side engaging part 221 is formed to have the same shape as that of the fifth modification example, and the housing side engaging part 223 is formed to have a surface with roughness. Then, an apex TP in the roughness of the housing side engaging part 223 abuts on the turning shaft side engaging part 221 at one point to thereby form an abutting part 517.

In this case, an abutting position where the apex TP in the roughness of the housing side engaging part 223 abuts on the turning shaft side engaging part 221 may be set to a position where a normal line L of the turning shaft side engaging part 221 passing an axial line CL of the turning shaft 211 as well as orthogonal to the axial line CL crosses the turning shaft side engaging part 221. According the above, relative rotation of the turning shaft 221 with respect to the housing 214 around the axis is regulated in good manner. Also according to the above, a suitable effect can be expected with respect to the above embodiment. The structure is not limited to the above, it is preferable that the turning shaft side engaging part 221 abuts on the housing side engaging part 223 at two or more points in the abutting part therebetween (not shown) for stably obtaining the same effect as the above embodiment.

The present invention is not limited to the above embodiment and the respective modification examples for achieving the invention, and various modifications may occur in a scope not departing from the object of the present invention.

For example, the output shafts of the first electric motor 15 and the second electric motor 16 (the first electric motor 25 and the second electric motor 26) are fixed to the housing 14 so as to face each other in the above embodiment and the respective modification examples. Instead of that, it is preferable that the first electric motor 15 and the second electric motor 16 (the first electric motor 25 and the second electric motor 26) are arranged so that output shafts thereof are in the same direction in a left and right direction of the turning shaft 11. It is also preferable that the first electric motor 15 and the second electric motor 16 (the first electric motor 25 and the second electric motor 26) are arranged so as to be shifted at least in one of the circumferential direction and the radial direction of the housing 14. The first electric motor 15 and the second electric motor 16 (the first electric motor 25 and the second electric motor 26) can be fixed to the housing 14 as described above to thereby generate the first driving force and the second driving force.

Also in this case, a first feed screw and a second feed screw such as the first ball screw part 11a and the second ball screw part 11b provided in the turning shaft 11 are left and right screws (opposite screws). Therefore, when the turning shaft 11 is moved in the axial direction, for example, the second electric motor 16 generates the second driving force to be an opposite direction to the first driving force with respect to the first driving force generated by the first electric motor 15.

According to the above, for example, the first torque T1 generated in the first ball screw part 11a and the second torque T2 generated in the second ball screw part 11b have equal absolute values and opposite directions, as a result, rotation of the turning shaft 11 can be prevented. Therefore, the same effect as the above embodiment and the respective modification examples can be obtained in this case, and for example, the degree of freedom in mounting at the time of assembling the turning device 10 to the vehicle can be secured.

What is claimed is:

1. A turning device comprising:
   a hollow housing;
   a turning shaft housed inside the housing, having a first male screw groove formed by one threading manner of a left screw and a right screw and a second male screw groove formed by the other threading manner of the left screw and the right screw, and turning left and right wheels to be turned by moving in an axial direction;
   a first nut screwed to the first male screw groove and rotatably supported inside the housing;
   a second nut screwed to the second male screw groove and rotatably supported inside the housing;
   a first driving source generating a first driving force;
   a second driving source operating independently of the first driving source and generating a second driving force;
   a first power transmission part transmitting the first driving force generated by the first driving source to the first nut and giving an axial force to the turning shaft by rotating the first nut;
   a second power transmission part transmitting the second driving force generated by the second driving source to the second nut and giving the axial force to the turning shaft by rotating the second nut;
a rotation regulating part provided over the housing and the turning shaft, allowing relative movement of the turning shaft with respect to the housing in the axial direction as well as regulating relative rotation of the turning shaft around its central axis with respect to the housing, wherein:
the rotation regulating part includes a turning shaft side engaging part provided in the turning shaft, and a housing side engaging part provided in the housing and engaged with the turning shaft side engaging part to allow relative movement of the housing and the turning shaft in the axial direction and to regulate relative rotation of the turning shaft around the axis with respect to the housing,
the rotation regulating part includes a protrusion that is the turning shaft side engaging part and extends to an outer side of the turning shaft in a radial direction or to an inner side of the housing in the radial direction, and a groove that is the housing side engaging part and is formed on an inner peripheral surface of the housing itself to extend in the axial direction of the turning shaft,
the protrusion and the groove are provided only at one place in an arbitrary part in a circumferential direction on an outer peripheral surface of the turning shaft, and
the protrusion is provided to protrude on an outer peripheral surface of an annular member, and an inner peripheral surface of the annular member is fitted to an outer peripheral surface of the turning shaft to be fixed to the turning shaft.

2. The turning device according to claim 1,
wherein the first driving source and the second driving source are configured, in cooperation with each other, to transmit the first driving force and the second driving force to the turning shaft through the first power transmission part and the second power transmission part so as to move the turning shaft.

3. The turning device according to claim 1,
an absolute value of a first torque applied to the turning shaft from the first nut by the first driving force transmitted by the first power transmission part and an absolute value of a second torque applied to the turning shaft from the second nut by the second driving force transmitted to the second power transmission part are equal.

4. The turning device according to claim 3,
wherein the first driving source and the second driving source generate the first driving force and the second driving force so that the absolute value of the first torque and the absolute value of the second torque become equal.

5. The turning device according to claim 3,
wherein an absolute value of the first driving force and an absolute value of the second driving force are equal, as well as a first reduction ratio at which the first power transmission part performs transmission to the first nut while reducing a rotation speed and a second reduction ratio at which the second power transmission part performs transmission to the second nut while reducing the rotation speed are equal.

6. The turning device according to claim 1,
wherein the first male screw groove and the second male screw groove respectively correspond to any one of a male screw groove of a ball screw having a rolling passage for rolling spherical rolling elements, a roller screw having a rolling passage for rolling roller-type rolling elements, and a sliding screw, and
the first nut and the second nut respectively correspond to any one of a ball screw nut housing the spherical rolling elements, a roller screw nut housing the roller-type rolling elements, and a sliding screw nut screwed to the sliding screw so as to correspond to the first male screw groove and the second male screw groove.

7. The turning device according to claim 6,
wherein the first driving source and the second driving source are arranged coaxially with the turning shaft and configured to directly transmit the first driving force and the second driving force to the first nut and the second nut, or arranged in parallel to the turning shaft and configured to transmit the first driving force and the second driving force to the first nut and the second nut through an endless member.

8. The turning device according to claim 1,
wherein an outer diameter of the outer peripheral surface of a fitting part of the turning shaft to which the annular member is fitted is larger than an outer diameter of the outer peripheral surface of the turning shaft other than the fitting part.

9. The turning device according to claim 1,
wherein a lubricating part is interposed between the housing side engaging part and the turning shaft side engaging part.

\* \* \* \* \*